(12) United States Patent
Weymann

(10) Patent No.: US 7,984,612 B2
(45) Date of Patent: Jul. 26, 2011

(54) EXHAUST-GAS TURBOCHARGER FOR AN INTERNAL COMBUSTION ENGINE

(75) Inventor: Hardy Weymann, Oberndorf (DE)

(73) Assignee: Daimler AG, Stuttgart (DE)

( * ) Notice: Subject to any disclaimer, the term of this patent is extended or adjusted under 35 U.S.C. 154(b) by 426 days.

(21) Appl. No.: 12/231,075

(22) Filed: Aug. 28, 2008

(65) Prior Publication Data

US 2009/0022578 A1    Jan. 22, 2009

Related U.S. Application Data

(63) Continuation-in-part of application No. PCT/EP2007/001609, filed on Feb. 24, 2007.

(30) Foreign Application Priority Data

Mar. 1, 2006   (DE) ............... 10 2006 009 295

(51) Int. Cl.
| | |
|---|---|
| F02B 33/44 | (2006.01) |
| F01B 25/00 | (2006.01) |
| F04D 15/00 | (2006.01) |
| F04D 27/00 | (2006.01) |
| G01F 1/46 | (2006.01) |
| G01F 1/34 | (2006.01) |

(52) U.S. Cl. .... 60/605.1; 415/17; 73/861.65; 73/861.69
(58) Field of Classification Search ............ 60/597–612, 60/605.1; 123/559.1–565; 415/17; 73/497, 73/861.65, 861.69; 324/164
See application file for complete search history.

(56) References Cited

U.S. PATENT DOCUMENTS

| | | | | |
|---|---|---|---|---|
| 1,831,218 | A * | 11/1931 | Winter et al. | 73/861.69 |
| 3,067,611 | A * | 12/1962 | Bowers et al. | 73/861.69 |
| 4,372,121 | A * | 2/1983 | Sokolov et al. | 60/606 |
| 4,439,728 | A * | 3/1984 | Rickman, Jr. | 324/164 |
| 5,099,686 | A * | 3/1992 | Kohler | 73/861.65 |
| 5,960,631 | A * | 10/1999 | Hayashi | 60/602 |
| 6,076,352 | A * | 6/2000 | Hayashi | 60/602 |
| 6,202,414 | B1 * | 3/2001 | Schmidt et al. | 60/612 |
| 6,293,103 | B1 * | 9/2001 | Gladden | 60/612 |
| 7,137,253 | B2 * | 11/2006 | Furman et al. | 60/597 |
| 7,380,446 | B2 * | 6/2008 | Baeuerle et al. | 73/118.1 |
| 7,568,338 | B2 * | 8/2009 | Noelle et al. | 60/605.1 |
| 2002/0170291 | A1 | 11/2002 | Shirakawa | |
| 2005/0017709 | A1 * | 1/2005 | Stolfus et al. | 324/174 |
| 2005/0132705 | A1 * | 6/2005 | Boley et al. | 60/605.1 |
| 2005/0155349 | A1 * | 7/2005 | Sugiura et al. | 60/605.1 |
| 2007/0144174 | A1 * | 6/2007 | Baeuerle et al. | 60/605.1 |
| 2007/0186551 | A1 * | 8/2007 | Ante et al. | 60/605.1 |
| 2008/0051973 | A1 * | 2/2008 | Gangopadhyay et al. | 701/102 |

(Continued)

FOREIGN PATENT DOCUMENTS

DE    14 280 43    11/1968

(Continued)

*Primary Examiner* — Thai Ba Trieu
(74) *Attorney, Agent, or Firm* — Klaus J. Bach

(57) ABSTRACT

In an exhaust-gas turbocharger for an internal combustion engine comprising an exhaust-gas turbine arranged in an exhaust strand of the internal combustion engine and a compressor arranged in an intake tract and connected to the exhaust gas turbine so as to be driven thereby, the compressor including a compressor wheel and a compressor housing surrounding the compressor wheel and having an inlet duct, a dynamic pressure probe is provided upstream of the compressor wheel in the inlet duct for measuring at least the total pressure in the air flow into the compressor.

9 Claims, 3 Drawing Sheets

U.S. PATENT DOCUMENTS

| | | | |
|---|---|---|---|
| 2008/0115570 A1* | 5/2008 | Ante et al. | 73/114.77 |
| 2009/0274565 A1* | 11/2009 | White | 415/17 |
| 2009/0314082 A1* | 12/2009 | Sujan et al. | 73/497 |
| 2010/0095670 A1* | 4/2010 | Grzonkowski et al. | 60/602 |

FOREIGN PATENT DOCUMENTS

| | | |
|---|---|---|
| DE | 15 762 78 | 5/1970 |
| DE | 21 553 11 | 5/1973 |
| DE | 25 07 917 | 9/1976 |
| DE | G 84 29 808.1 | 1/1985 |
| DE | 39 23 753 | 1/1991 |
| DE | 19509208 A1 * | 12/1995 |
| DE | 100 54 843 | 5/2002 |
| DE | 102 37 416 | 2/2004 |
| DE | 10 2004 024 270.4 | 12/2005 |
| EP | 813043 A1 * | 12/1997 |
| JP | 04081598 A * | 3/1992 |
| JP | 06 049726 | 2/1994 |
| JP | 10 115535 | 5/1998 |

\* cited by examiner

EXHAUST-GAS TURBOCHARGER FOR AN INTERNAL COMBUSTION ENGINE

This is a continuation-in-part application of pending international patent application PCT/EP2007/001609 filed Feb. 24, 2007 and claiming the priority of German patent application 10 2006 009 295.3 filed Mar. 1, 2006.

BACKGROUND OF THE INVENTION

The invention relates to an exhaust-gas turbocharger for an internal combustion engine, in particular for an internal combustion engine of a utility vehicle, with an exhaust gas turbocharger having an exhaust gas turbine arranged in an exhaust tract and a turbine-driven compressor arranged in an intake duct of the internal combustion engine and to a method for determining the air mass supplied by the compressor to the internal combustion engine.

Knowledge of the air mass supplied to an internal combustion engine is needed in passenger vehicles and utility vehicles as an engine-related measured variable for example for exhaust-gas recirculation control. In passenger vehicle engines, hot film air mass sensors (HFM) are used as standard for measuring the air mass sucked in. For reasons of durability, of sensor drift and interface definition with respect to the vehicle, it is generally not possible to integrate an HFM sensor of said type in utility vehicle engines. Furthermore, HFM sensors of said type are conventionally sensitive to pulsations and are extremely susceptible to contamination.

There is therefore a demand for a device or measure, which can also be advantageously used in utility vehicles for measuring an air mass flow to an internal combustion engine.

In this connection, DE 15 76 278 A, for example, discloses a fuel injection system for internal combustion engine, which fuel injection system has a freely adjustable throttle flap in an air intake duct. Provided upstream of the throttle flap are a dynamic pressure measuring device and a further throttle element. The dynamic pressure measuring device comprises a dynamic pressure probe for measuring the total pressure in the air intake duct, and a measurement bore in the duct wall for measuring the static pressure in the air intake duct, with the further throttle element being positioned in the air intake duct between the dynamic pressure probe and the measurement bore. Fuel is supplied to the engine as a function of the differential pressure which is determined from the total pressure and from the static pressure in the air intake duct.

Furthermore, Patent Abstracts of Japan JP 63-090621 A discloses an exhaust-gas turbocharger for an internal combustion engine including a compressor upstream of which an air mass sensor is arranged. No further details are given in the abstract regarding the type and mode of operation of the air mass sensor which is used.

DE 14 28 043 A describes a turbocompressor for an internal combustion engine which has, arranged between the impeller blades, a dynamic pressure probe for measuring a characteristic flow angle.

It is an object of the present invention to provide an exhaust-gas turbocharger for an internal combustion engine, in particular an internal combustion engine of a utility vehicle, which permits simple and reliable measurement of the air mass sucked in by the internal combustion engine, which measured variable can be used for example for exhaust-gas recirculation control. It is a further object of the invention to provide a method for determining the air mass sucked in by an internal combustion engine.

SUMMARY OF THE INVENTION

In an exhaust-gas turbocharger for an internal combustion engine comprising an exhaust-gas turbine arranged in an exhaust strand of the internal combustion engine and a compressor arranged in an intake tract and connected to the exhaust gas turbine so as to be driven thereby, the compressor including a compressor wheel and a compressor housing surrounding the compressor wheel and having an inlet duct, a dynamic pressure probe is provided upstream of a compressor wheel in the inlet duct for measuring at least the total pressure in the air flow into the compressor.

By means of the total pressure, measured by the dynamic pressure probe, in the flow duct of the compressor of the exhaust-gas turbocharger, it is possible in a simple manner to determine the air mass sucked in by the compressor and therefore also by the internal combustion engine. The dynamic pressure probe is a measurement system which is not sensitive to dust and oil and which has a long service life and an extremely low level of sensor drift, such that the exhaust-gas turbocharger according to the invention can advantageously also be used for utility vehicles and permits simple and reliable measurement of the air mass sucked in by the internal combustion engine.

In one embodiment of the invention, the dynamic pressure probe is arranged directly in the housing of the compressor, so as to obtain a very compact design of the exhaust-gas turbocharger including the air mass sensor.

In an alternative embodiment of the invention, the dynamic pressure probe is arranged in a molded flow duct part directly upstream of the compressor housing, for example if a molded component must be placed between the hose connecting piece of the intake system and the compressor for example in the event of interface problems between the intake system and the compressor inlet.

In one embodiment of the invention, the dynamic pressure probe is designed to measure the total pressure and the static pressure in the flow duct of the compressor, and a control unit determines from the measured total pressure and from the measured static pressure the differential pressure in the flow duct of the compressor, and determines from said differential pressure the air mass sucked in by the internal combustion engine.

In an alternative embodiment of the invention, the dynamic pressure probe is designed to measure the total pressure in the flow duct of the compressor; a measurement bore is also provided in a wall of the flow duct of the compressor to measure the static pressure in the flow duct of the compressor; and a control unit determines from the measured total pressure and from the measured static pressure the differential pressure in the flow duct of the compressor, and determines from said differential pressure the air mass sucked in by the internal combustion engine.

According to a further aspect of the invention, a method for determining an air mass which is sucked in by an internal combustion engine including an exhaust-gas turbocharger with a compressor, comprises the steps of measuring a total pressure and a static pressure in a flow duct of the compressor, determining from the measured total pressure and from the measured static pressure a differential pressure in the flow duct of the compressor, and determining from the determined differential pressure the air mass sucked in by the internal combustion engine, with at least the total pressure in the flow duct of the compressor being measured by a dynamic pressure probe arranged in the flow duct upstream of a compressor wheel of the compressor.

With said method, it is possible to obtain the same effects and advantages as have been explained above in connection with the exhaust-gas turbocharger according to the invention. In particular, said method can advantageously be used for internal combustion engine of utility vehicles.

Here, in one embodiment of the invention, both the total pressure and also the static pressure in the flow duct of the compressor are measured by means of the dynamic pressure probe.

In an alternative embodiment of the invention, the total pressure in the flow duct of the compressor is measured by means of the dynamic pressure probe, while the static pressure in the flow duct of the compressor is measured by means of a measurement bore in a wall of the flow duct of the compressor.

The invention and features and advantages of the invention will become more readily apparent from the following description of exemplary embodiments of the invention described below with reference to the accompanying drawings.

DESCRIPTION OF A PARTICULAR EMBODIMENT

Figure 1:
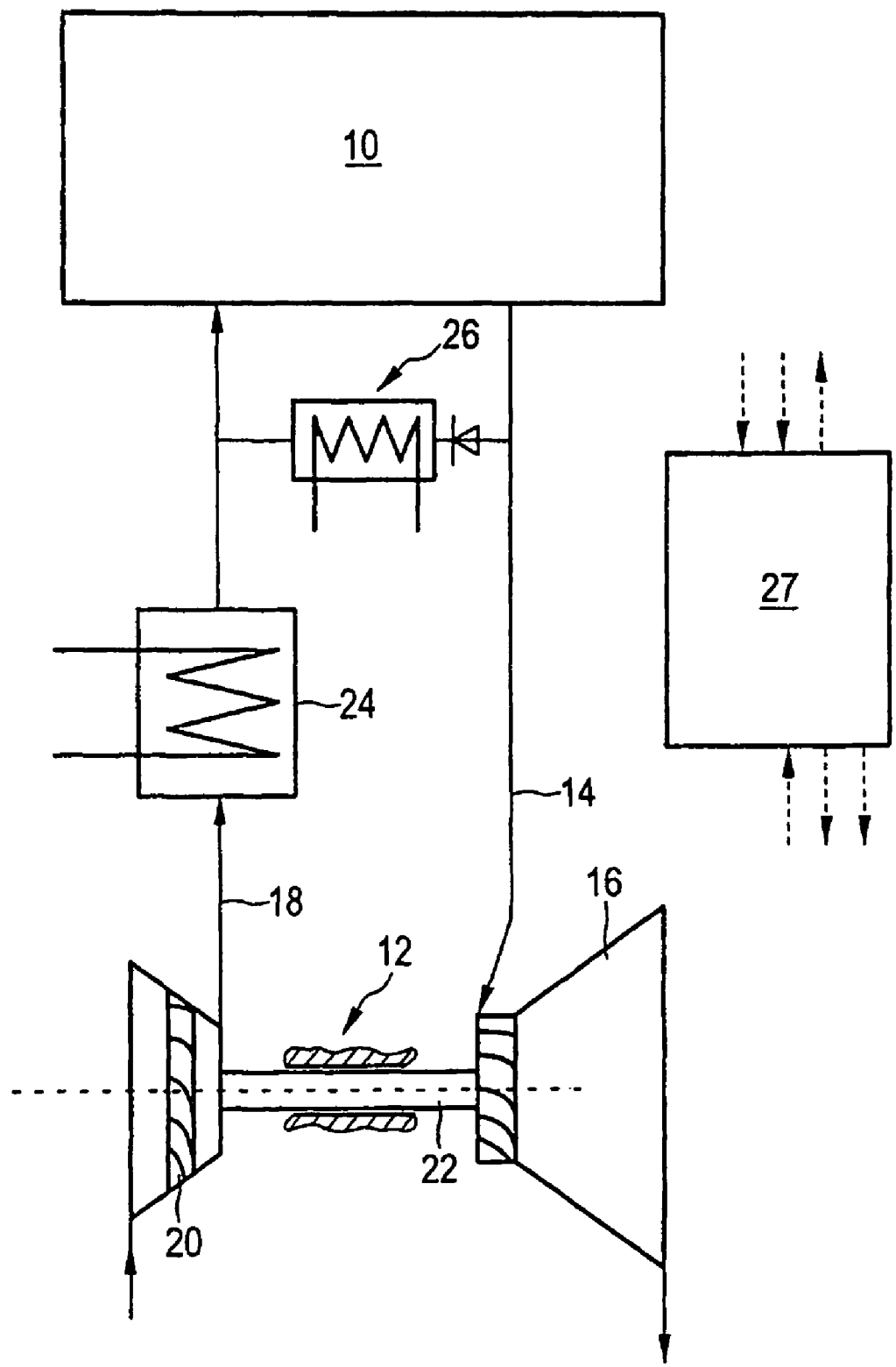
FIG. 1 is a schematic illustration of an internal combustion engine having an associated turbocharger.

FIG. 1 schematically illustrates an internal combustion engine 10 which can be used in particular for a utility vehicle. The internal combustion engine 10 is fitted with an exhaust-gas turbocharger 12 which comprises an exhaust-gas turbine 16 in an exhaust strand 14 of the internal combustion engine 10 and a compressor 20 in an intake tract 18, the compressor wheel of which compressor 20 is driven by the turbine wheel by means of a shaft 22. In operation of the internal combustion engine 10, the turbine wheel of the exhaust-gas turbine 16 is set in rotation by the exhaust gases in the exhaust strand, such that in the compressor 20, combustion air from the environment is sucked in and compressed to an increased pressure.

A charge-air cooler 24 is arranged in the intake tract 18 downstream of the compressor 20, in which charge-air air cooler 24 the compressed charge air from the compressor 20 is cooled before being supplied to the cylinder inlets of the internal combustion engine 10.

The internal combustion engine 10 is also assigned an exhaust-gas recirculation device 26 via which exhaust gas from the exhaust strand 14 upstream of the exhaust-gas turbine 16 can be recirculated into the intake tract 18 downstream of the charge-air cooler 24. The exhaust-gas recirculation device 26 comprises a recirculation line, a valve which is provided in the recirculation line, and an exhaust-gas cooler.

Also provided for the internal combustion engine 10 is a control unit 27 which controls the operation of the exhaust-gas turbocharger 12, of the charge-air cooler 24, of the exhaust-gas recirculation device 26 and the like as a function of various state and operating variables of the internal combustion engine 10.

A first exemplary embodiment of the compressor 20 of the exhaust-gas turbocharger 12 of the internal combustion engine will now be explained in more detail on the basis of FIGS. 2 and 3.

Figure 2:
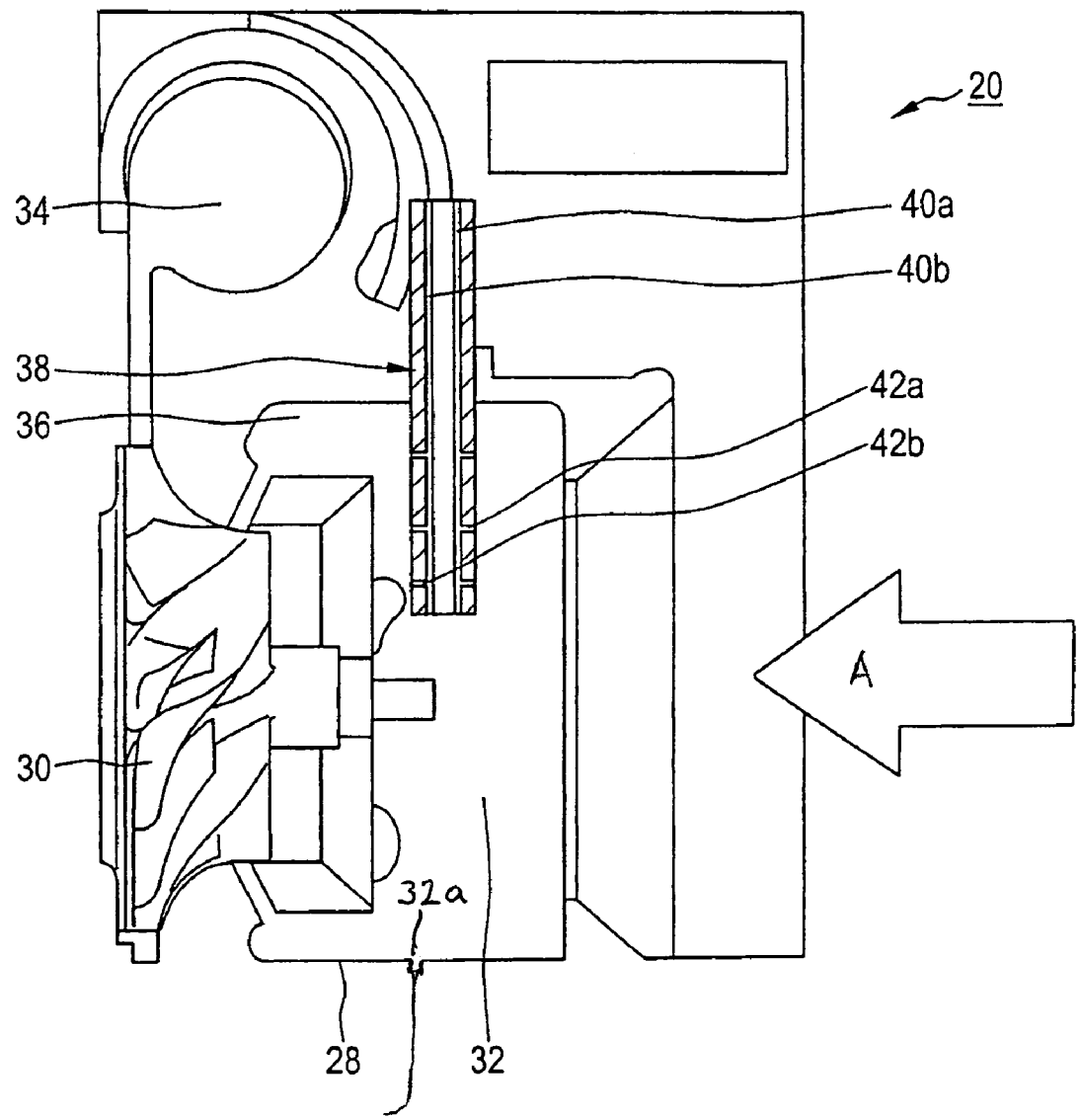
FIG. 2 shows, in a partially sectional view, a first exemplary embodiment of a compressor of the exhaust-gas turbocharger of FIG. 1.

The compressor 20 comprises a compressor wheel 30 which is arranged in a housing 28 and which sucks in air via a flow duct 32, as indicated by the arrow in FIG. 2, and which discharges said air via a spiral duct 34 into the intake tract 18 of the internal combustion engine 10. Furthermore, in a manner known per se, an air collecting space 36 is provided parallel to the flow duct 32 for the radial supply of combustion air into the flow duct 32 of the compressor housing 28, and one or more guide vane structures are provided for adjusting the flow conditions in the compressor. Since the design and the mode of operation of a compressor 20 of said type are already sufficiently well known and the present invention is also not restricted to a specific compressor, a detailed explanation of the compressor 20 is omitted here.

Also integrated into the compressor 20 upstream of the compressor wheel 30 is a dynamic pressure probe 38 which projects in the radial direction into the compressor housing 28 into the vicinity of the shaft axis of the compressor wheel 30.

The design and mode of operation of dynamic pressure probes are sufficiently well known, for which reason a detailed explanation in this regard is omitted. In this connection, reference is merely made by way of example to the two patent documents DE 195 09 208 A and DE 196 23 586 A.

In the exemplary embodiment illustrated in FIG. 2, the dynamic pressure probe 38 has a first effective pressure duct 40a, which faces toward the air flow in the flow duct 32, and a second effective pressure duct 40b, which faces away from the air flow in the flow duct 32. The first effective pressure duct 40a is open facing toward the air flow in the flow duct 32 via at least one first effective pressure bore 42a, such that the total pressure (that is to say static pressure+dynamic pressure) of the air flow in the flow duct 32 acts on the first effective pressure duct 40a and the total pressure of the air flow can be measured in this way. In a similar way, the second effective pressure duct 40b is open at least partially facing away from the air flow in the flow duct 32 via at least one second effective pressure bore 42b, such that only the static pressure of the air flow in the flow duct 32 acts on the second effective pressure duct 40b and the static pressure of the air flow can be measured in this way. The first and the second effective pressure bores 42a, 42b are preferably distributed in each case uniformly over the flow cross section of the flow duct 32.

The total pressure measured by means of the first effective pressure duct 40a and the static pressure of the air flow in the flow duct 32 measured by means of the second effective pressure duct 40b are supplied from the dynamic pressure probe 38 to the control unit 27 which, from these, determines a differential pressure which is proportional to the flow speed in the flow duct 32 and which is therefore (for example by means of the air density) a measure for the air mass sucked in by the compressor 20 of the exhaust-gas turbocharger 12 and therefore by the internal combustion engine 10.

The dynamic pressure probe 38 used here has a much longer service life than conventional hot film air mass sensors while providing the same measurement accuracy. The exhaust-gas turbocharger 12 with an integrated dynamic pressure probe 38 therefore provides a simple, cost-effective and reliable measuring system for the air mass sucked in by the internal combustion engine 10, and can advantageously be used in particular also in utility vehicles.

Figure 3:
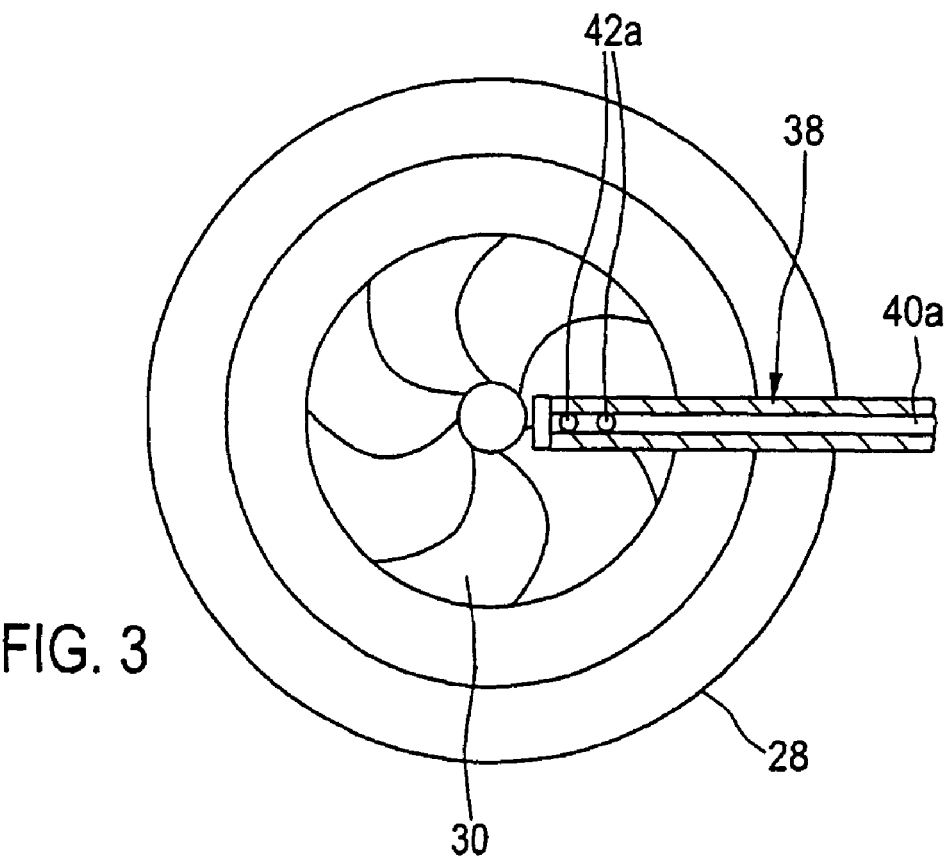
FIG. 3 is an axial plan view of the compressor of FIG. 2 as seen in the direction of arrow A.

In a modification to the first exemplary embodiment of FIGS. 2 and 3, the dynamic pressure probe 38 has only the first effective pressure duct 40a with the first active pressure bores 42a for measuring the total pressure in the flow duct 32. To measure the static pressure in the flow duct 32, instead of the second effective pressure duct 40b of the dynamic pressure probe 38, a measurement bore 32a is provided in a compressor housing wall of the flow duct 32, the measuring opening of which measurement bore runs for example approximately parallel to the air flow direction.

In this case, too, the control unit 27 can determine, from the total pressure in the flow duct 32 measured by the dynamic pressure probe 38 and from the static pressure in the flow duct 32 measured by the measurement bore, a differential pressure, and finally, from the latter, an air mass sucked in by the internal combustion engine 10.

Figure 4:
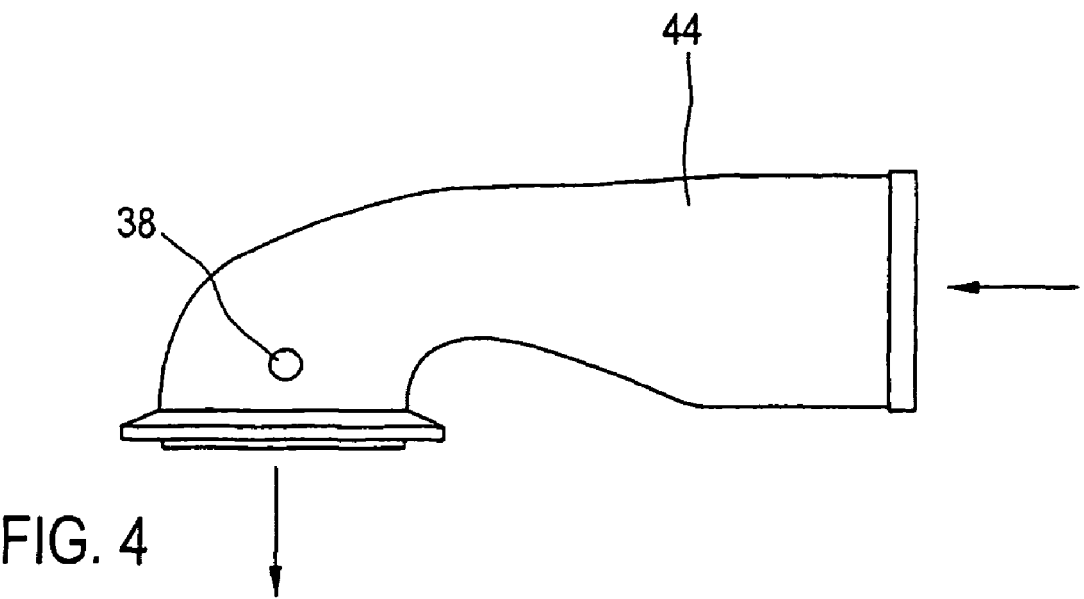
FIG. 4 shows a side view of an exemplary embodiment of a molded flow duct component which is used directly upstream of the compressor of the exhaust-gas turbocharger.

A second exemplary embodiment will now be explained with reference to FIG. 4.

For reasons of interface problems between the intake system and the compressor inlet, it is in practice not always possible to push a hose connecting piece directly onto the compressor 20. For this reason, a molded flow duct part 44 composed for example of aluminum is placed upstream of the compressor 20 by means of a V-belt clip, a normal screw connection or the like, onto which molded part 44 a hose connecting piece of the intake system can finally be placed.

Similarly to the above-described first exemplary embodiment, a dynamic pressure probe 38 is integrated into said molded flow duct part 44. The design, the arrangement and the mode of operation of the dynamic pressure probe 38 are analogous to the above explanations; the dynamic pressure probe 38 serves in particular to measure the total pressure and the static pressure of the air flow in the molded flow duct part 44. Here, the dynamic pressure probe 38 is installed into the molded part 44 as close as possible to the compressor 20, as indicated in FIG. 4.

A modification similar to the first exemplary embodiment is possible in the case of the second exemplary embodiment, too. That is to say, the dynamic pressure probe 38 serves only to measure the total pressure, and the static pressure in the molded flow duct part 44 is measured by means of the measurement bore 32a.

What is claimed is:

1. A method for determining an air mass flowing to an internal combustion engine including an exhaust-gas turbocharger comprising an exhaust-gas turbine (16) arranged in an exhaust strand (14) of the internal combustion engine (10) and a compressor (20) arranged in an intake tract (18) of the internal combustion engine (10) and connected to the exhaust gas turbine (16) so as to be driven thereby, the compressor (20) including a compressor wheel (30) and a compressor housing (28) surrounding the compressor wheel (30) and having an inlet duct (32), a single dynamic pressure probe (38) provided upstream of a compressor wheel (30) in the inlet duct (32) having an intake air pressure sensor structure (40a) for measuring a total pressure and a static pressure sensor structure (42b) for sensing the static pressure, and a control unit (27), said method comprising the steps of:
measuring a total pressure and a static pressure in the inlet duct of the compressor (20),
determining from the measured total pressure and from the measured static pressure a differential pressure in the inlet duct of the compressor which represents the pressure component generated by the speed of the air flow into the compressor; and
determining from the determined differential pressure the air mass supplied to the internal combustion engine (10).

2. The method as claimed in claim 1, wherein the total pressure and the static pressure in the inlet duct (32) of the compressor (20) are measured by means of the single dynamic pressure probe (38) which includes means for measuring the total pressure as well as the static pressure.

3. The method as claimed in claim 1, wherein the total pressure of the air entering the compressor (20) is measured by means of the single dynamic pressure probe (38), and the static pressure in the air entering the compressor (20) is measured by way of a measurement bore (32a) in a wall of the inlet duct (32) of the compressor (20).

4. An exhaust-gas turbocharger for an internal combustion engine (10), comprising:
an exhaust-gas turbine (16) arranged in an exhaust strand (14) of the internal combustion engine (10);
a compressor (20) arranged in an intake tract (18) of the internal combustion engine (10) and connected to the exhaust gas turbine (16) so as to be driven thereby, the compressor (20) including a compressor wheel (30) and a compressor housing (28) surrounding the compressor wheel (30) and having an inlet duct (32);
a single dynamic intake air pressure probe (38) including:
an intake air pressure sensor structure (40a) provided upstream of the compressor wheel (30) in the inlet duct (32) for measuring a total pressure of the air flow into the compressor (20); and
a static pressure sensor structure (42b) for sensing a static pressure of the air flow into the compressor (20); and
a control unit (27), which determines from the measured total pressure and from the measured static pressure a differential pressure in the flow duct of the compressor; and which determines from said differential pressure, which represents the pressure component generated by the speed of the air flow into the compressor, an air mass sucked in by the internal combustion engine (10).

5. The exhaust-gas turbocharger as claimed in claim 4, wherein the single dynamic intake air pressure probe (38) is arranged in the housing (28) of the compressor (20).

6. The exhaust-gas turbocharger as claimed in claim 4, wherein the single dynamic intake air pressure probe (38) is arranged in a molded flow duct part (44) directly upstream of the housing (28) of the compressor (20).

7. The exhaust-gas turbocharger as claimed in claim 4, wherein the single dynamic intake air pressure probe (38) is designed to measure the total pressure and also the static pressure in the flow duct (32) of the compressor (20).

8. The exhaust-gas turbocharger as claimed in claim 4, further comprising a measurement bore (32a) being provided in the compressor housing wall of the inlet duct (32) to measure the static pressure in the inlet duct (32).

9. The exhaust gas turbocharger according to claim 4, wherein the single dynamic pressure probe (38) further includes a first effective pressure duct (40a) which faces toward the air flow into the compressor and a second effective pressure duct (40b) which is open in a direction facing away from the air flow toward the probe (38) such that only the static air pressure in the flow duct (32) is measured by the second pressure duct (40b).

* * * * *